(12) United States Patent
Liu et al.

(10) Patent No.: US 9,057,905 B2
(45) Date of Patent: Jun. 16, 2015

(54) TOUCH SENSOR, MANUFACTURING METHOD THEREOF, AND LIQUID CRYSTAL DISPLAY HAVING TOUCH PANEL

(71) Applicant: BEIJING BOE OPTOELECTRONICS TECHNOLOGY CO., LTD., Beijing (CN)

(72) Inventors: Yingming Liu, Beijing (CN); Haisheng Wang, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 151 days.

(21) Appl. No.: 13/876,081
(22) PCT Filed: Nov. 12, 2012
(86) PCT No.: PCT/CN2012/084472
§ 371 (c)(1),
(2) Date: Mar. 26, 2013

(87) PCT Pub. No.: WO2013/143292
PCT Pub. Date: Oct. 3, 2013

(65) Prior Publication Data
US 2014/0063097 A1 Mar. 6, 2014

(30) Foreign Application Priority Data
Mar. 27, 2012 (CN) .......................... 2012 1 0083380

(51) Int. Cl.
*G02F 1/1333* (2006.01)
*G06F 3/041* (2006.01)
(52) U.S. Cl.
CPC .......... *G02F 1/13338* (2013.01); *G06F 3/0412* (2013.01); *G06F 3/041* (2013.01)
(58) Field of Classification Search
CPC .... G02F 1/13338; G06F 3/041; G06F 3/0412
USPC .................................... 349/12; 345/173, 174
See application file for complete search history.

(56) References Cited

U.S. PATENT DOCUMENTS 6,411,033 B1 * 6/2002 Mori et al. ................... 313/582
2010/0265193 A1 10/2010 Kung et al.
2014/0063097 A1 3/2014 Liu et al.

FOREIGN PATENT DOCUMENTS

| CN | 101630215 A | 1/2010 |
| CN | 102253775 A | 11/2011 |
| CN | 102722276 A | 10/2012 |
| JP | 2011-086084 A | 4/2011 |
| TW | 201037585 A | 10/2010 |

OTHER PUBLICATIONS

International Search Report: Jan. 31, 2013: PCT/CN2012/084472.
International Search Report mailed Jan. 31, 2013; PCT/CN2012/084472.
International Preliminary Report on Patentability Appln. No. PCT/CN2012/084472; Dated Oct. 1, 2014.

* cited by examiner

*Primary Examiner* — Michael Caley
(74) *Attorney, Agent, or Firm* — Ladas & Parry LLP

(57) ABSTRACT

Embodiments of the invention provide a touch sensor, a manufacturing method thereof and a liquid crystal display having touch panel. The touch sensor comprises a substrate, a touch sensing layer in a first direction, a touch sensing layer in a second direction perpendicular to the first direction, an insulation layer and a metal bridge. The touch sensing layers in the first and second directions are provided on a surface of the substrate, the touch sensing layer in the first direction is discontinuous, and the touching sensing layer in the second direction is continuous. The insulation layer is provided on the substrate, the touch sensing layer in the first direction and the touch sensing layer in the second direction. The metal bridge is provided on the insulation layer and connects with the touch sensing layer in the first direction.

9 Claims, 1 Drawing Sheet

TOUCH SENSOR, MANUFACTURING METHOD THEREOF, AND LIQUID CRYSTAL DISPLAY HAVING TOUCH PANEL

TECHNICAL FIELD

Embodiments of the invention relate to a touch sensor, a manufacturing method thereof, and a liquid crystal display having a touch panel.

BACKGROUND

In recent years, liquid crystal displays having touch panel have been developed rapidly. According to their structures, the liquid crystal displays having touch panel are mainly classified into Touch-Panel-Add-On type, Touch-Panel-On-Cell type, and Touch-Panel-In-Cell type.

FIG. 1 illustrates a touch sensor of a Touch-Panel-Add-On type liquid crystal display in the conventional art. As shown in FIG. 1, the touch sensor comprises: a substrate 1, a metal bridge 2, a first insulation layer 3, a touch sensing layer 4 in an X direction, a touch sensing layer 4' in a Y direction, and a second insulation layer 5. The touch sensing layer 4 in the X direction is discontinuous and becomes electrically communicated by the metal bridge 2. In addition, a cover glass (not shown) may be disposed on a surface of the touch sensor, so as to protect the surface of the touch sensor and block a circumference light leakage region. In general cases, the substrate 1 is also formed of glass, thus the touch sensor having two layers of glass is called as Glass to Glass Touch Sensor.

A manufacturing method of the above touch sensor comprises the following steps:

Step 101, depositing a metal layer on the substrate 1, and performing a first patterning process on the metal layer by using a mask plate to obtain the metal bridge 2. In addition, a metal layer (not shown) in a bonding region is also obtained. The bonding region refers to the region which is connected with a flexible circuit plate (FPC).

Step 102, depositing the first insulation layer 3 on the substrate 1 after the step 101, and performing a second patterning process on the first insulation layer 3 by using a mask plate to form contact holes in the first insulation layer 3, wherein these contact holes expose corresponding portions of the metal bridges 2. In addition, in this patterning process, the first insulation layer 3 in the bonding region is etched away to expose the metal layer in the bonding region.

Step 103, depositing a transparent conductive layer on the substrate 1 after the step 102, and performing a third patterning process on the transparent conductive layer by using a mask plate to obtain the touch sensing layer 4 in the X direction and the touch sensing layer 4' in the Y direction. In addition, a transparent conductive layer in the bonding region which covers the metal layer is also obtained. The metal layer and the conductive layer contacting with each other in the bonding region are connected with the FPC, so as to turn on the touch sensor and the thin film transistor liquid crystal display (TFT-LCD) panel in the liquid crystal display having touch panel. For example, the transparent conductive layer is formed of indium tin oxide (ITO).

It can be seen from FIG. 1 that the touch sensing layer 4 in the X direction is discontinuous and becomes electrically communicated by the metal bridge 2 and the touch sensing layer 4' in the Y direction is continuous itself.

Here, the X direction refers to the direction parallel to the paper surface, and the Y direction refers to the direction perpendicular to the paper surface. The X direction and the Y direction are perpendicular to each other. The touch sensing layer 4 in the X direction and the touch sensing layer 4' in the Y direction do not connect with each other.

Step 104, depositing the second insulation layer 5 on the substrate 1 after the step 103, and performing a fourth patterning process on the second insulation layer 5 by using a mask plate to obtain the second insulation layer 5 protecting the touch sensing layers in the X and Y directions. So far, the manufacturing of the touch sensor is completed.

It can be seen from the above procedure that it needs to perform patterning process four times by using four mask plates to manufacture the touch sensor in the conventional art, thus the number of the manufacturing steps is relatively large, and the manufacturing cost is relatively high.

SUMMARY

According to an embodiment of the invention, there is provided a touch sensor. The touch sensor comprises a substrate, a touch sensing layer in a first direction, a touch sensing layer in a second direction perpendicular to the first direction, an insulation layer and a metal bridge. The touch sensing layer in the first direction and the touch sensing layer in the second direction are provided on a surface of the substrate, the touch sensing layer in the first direction is discontinuous, and the touching sensing layer in the second direction is continuous. The insulation layer is provided on the substrate, the touch sensing layer in the first direction and the touch sensing layer in the second direction. The metal bridge is provided on the insulation layer, and the metal bridge connects with the touch sensing layer in the first direction so that the touch sensing layer in the first direction becomes electrically communicated.

According to another embodiment of the invention, there is provided a liquid crystal display having touch sensor. The liquid crystal display comprises the above-described touch sensor.

According to still another embodiment of the invention, there is provided a method of manufacturing a touch sensor. The method comprise:

Step 1): depositing a transparent conductive layer on a substrate, and forming a touch sensing layer in a first direction and a touch sensing layer in a second direction by a first patterning process, wherein the touch sensing layer in the first direction is discontinuous, the touch sensing layer in the second direction is continuous, and the first direction and the second direction are perpendicular to each other; Step 2): depositing an insulation layer on the substrate after the Step 1), and forming a contact hole in the insulation layer by a second patterning process, wherein the contact hole exposes a portion of the touch sensing layer in the first direction under the contact hole; and Step 3): depositing a metal layer on the substrate after the Step 2), and forming a metal bridge connecting with the touch sensing layer in the first direction by a third patterning process.

It can be seen that the embodiments of the invention can manufacture the touch sensor by performing patterning process three times by three mask plates. Thus, the manufacturing procedure of the touch sensor can be simplified, the manufacturing cost can be reduced, and the competitive power of the products can be improved improved.

BRIEF DESCRIPTION OF DRAWINGS

In order to describe the technical solutions of the embodiments of the invention, it will give a brief description to the figures of the embodiments below. Obviously, the below described figures are only relate some embodiments of the invention, and not intended to restrict the invention.

DETAILED DESCRIPTION

In order to make aims, technical solution and advantages of the embodiments of the invention to be clearer, the technical solutions of the embodiments of the invention will be described below clearly and fully in connection with the figures of the embodiments of the invention. Obviously, the described embodiments are a portion of the embodiments of the invention, not to be all embodiments. Based on the described embodiments of the invention, all additional embodiments, which could be obtained by those skilled in the art without paying creative work, belong to the scope of the protection of the invention.

Figure 1:
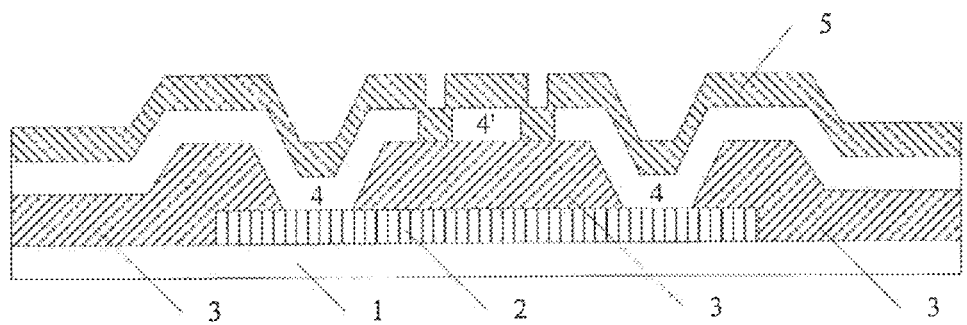
FIG. 1 is a structural schematic view of a touch sensor in the conventional art.
Figure 2:
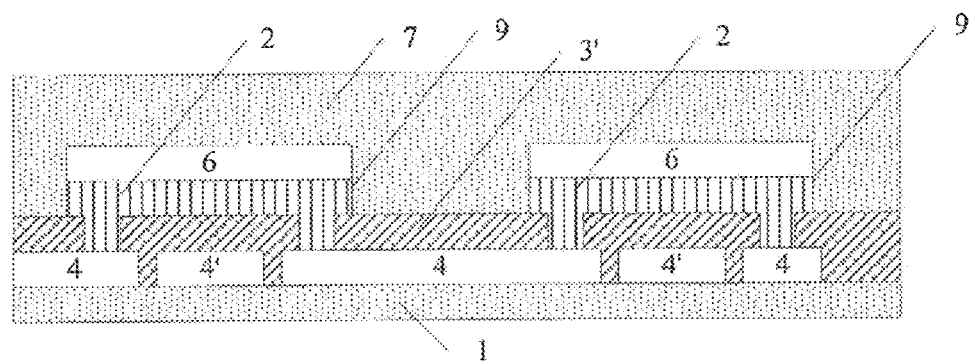
FIG. 2 is a structural schematic view of a touch sensor according to embodiments of the invention.

FIG. 2 is a structural schematic view of a touch sensor according to embodiments of the invention. As shown in FIG. 2, the touch sensor according to the embodiments of the invention comprises: a substrate 1, a touch sensing layer 4 in an X direction, a touch sensing layer 4' in a Y direction, an insulation layer 3' and a metal bridge 2. The touch sensing layer 4 in the X direction and the touch sensing layer 4' in the Y direction are disposed on a surface of the substrate 1. The touch sensing layer 4 in the X direction is discontinuous, and the touch sensing layer 4' in the Y direction is continuous. The insulation layer 3' is provided on the substrate 1, the touch sensing layer 4 in the X direction and the touch sensing layer 4' in the Y direction. The metal bridge 2 connects with the touch sensing layer 4 in the X direction, and is provided on the insulation layer 3'.

Preferably, the touch sensing layer 4 in the X direction and the touch sensing layer 4' in the Y direction are formed by a same transparent conductive material having a same thickness. For example, the transparent conductive material is ITO.

For example, the metal bridge 2 is formed by a metal of Mo.

The touch sensor according to the embodiments of the invention further comprises a transparent conductive layer 6. The transparent conductive layer 6 is provided on the metal bridge 2 to protect the metal bridge 2. This is because of the fact that: if the transparent conductive layer 6 is not formed, the metal for forming the metal bridge 2 may be oxidized at the surface, and thus a change in electric resistance may occur and the touch function may be adversely influenced. In addition, for example, the transparent conductive layer 6 is formed of ITO.

The touch sensor according to the embodiments of the invention further comprises an upper glass 7 used as an upper substrate to protect the surface of the touch sensor and block a circumference light leakage region. A groove 9 matching with the metal bridge 2 is disposed at a lower surface of the upper glass 7. It can be seen from FIG. 2 that the lower surface of the upper glass 7 is a surface facing the touch sensor.

A manufacturing method of the touch sensor of according to the embodiments of the invention will be explained in detail below. The method comprises:

Step 201, depositing a transparent conductive layer on the substrate 1, and forming the touch sensing layer 4 in the X direction and the touch sensing layer 4' in the Y direction through a first patterning process by using a first mask plate.

The touch sensing layer 4 in the X direction is discontinuous, and the touch sensing layer 4' in the Y direction is continuous. Preferably, the touch sensing layer 4 in the X direction and the touch sensing layer 4' in the Y direction have a same thickness. For example, the transparent conductive layer is formed of ITO.

Step 202, depositing the insulation layer 3' on the substrate 1 after the Step 201, and forming a contact hole in the insulation layer 3' through a second patterning process by using a second mask plate, wherein the contact hole exposes a portion of the touch sensing layer 4 in the X direction under the contact hole.

Figure 3:
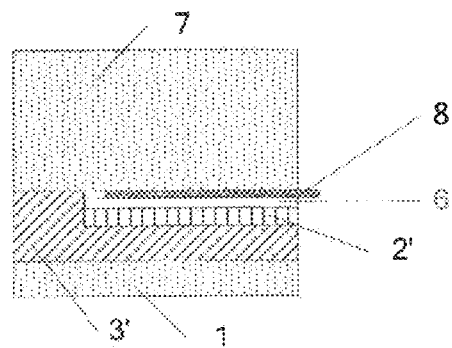
FIG. 3 is a structural schematic view of a bonding region of the touch sensor according to embodiments of the invention.

At the same time of forming the contact hole in the insulation layer 3', an insulation layer pattern 3' in the bonding region is also formed, as shown in FIG. 3.

Step 203, depositing a metal layer on the substrate 1 after the Step 202, and forming the metal bridge 2 through a third patterning process by using a third mask plate. The touch sensing layer 4 in the X direction becomes electrically communicated by the metal bridge 2, thus the touch sensing layers in the X and Y directions are respectively electrically communicated so that the touch function can be achieved.

At the same time of forming the metal bridge 2, a metal line 2' on the insulation layer pattern 3' in the bonding region is also formed.

So far, the manufacturing of the touch sensor according to the embodiments of the invention is completed.

Preferably, the Step 203 further comprises: depositing a protection layer (for example, a ITO layer) on the substrate 1 with the metal layer for forming the metal bridge, and forming the metal bridge 2 and a transparent conductive layer 6 covering the metal bridge 2 by the third patterning process. At the same time, the metal line 2' on the insulation layer pattern 3' in the bonding region, and the transparent conductive layer 6 covering the metal line 2' are also formed, as shown in FIGS. 2 and 3.

The bonding region is connected with a FPC 8 by the metal line 2' and the transparent conductive layer (ITO) 6 so that the touch sensor and a TFT-LCD panel are connected with each other.

After the step 203, the manufacturing method of the touch sensor according to the embodiments of the invention may further comprise the following steps: attaching the cover glass 7 used as the upper substrate to the surface of the resultant touch sensor by a frame glue or other glues to protect the surface of the touch sensor and block the circumference light leakage region. A groove 9 matching with the metal bridge 2 is disposed at the lower surface of the cover glass 7. The lower surface of the cover glass 7 is the surface facing the touch sensor.

It can be seen from the above procedure that it only needs to perform patterning process three times by using three mask plates to manufacture the touch sensor according to the embodiments of the invention. Thus the manufacturing procedure of the touch sensor can be simplified, the manufacturing cost can be reduced, and the competitive power of the products can be improved.

The embodiments of the invention also provide a liquid crystal display having touch panel. The liquid crystal display comprises a TFT-LCD panel and the touch sensor described in the above embodiments.

The foregoing embodiments merely are exemplary embodiments of the invention, and not intended to define the scope of the invention, and the scope of the invention is determined by the appended claims.

What is claimed is:

1. A touch sensor, comprising a substrate, a touch sensing layer in a first direction, a touch sensing layer in a second direction perpendicular to the first direction, an insulation layer and a metal bridge, wherein:
   the touch sensing layer in the first direction and the touch sensing layer in the second direction are provided on a surface of the substrate, the touch sensing layer in the first direction is discontinuous, and the touching sensing layer in the second direction is continuous;
   the insulation layer is provided on the substrate, the touch sensing layer in the first direction and the touch sensing layer in the second direction;
   the metal bridge is provided on the insulation layer, and the metal bridge connects with the touch sensing layer in the first direction so that the touch sensing layer in the first direction becomes electrically communicated; and
   the touch sensor further comprises a transparent conductive layer, and the transparent conductive layer is provided on the metal bridge and directly contacts the metal bridge.

2. The touch sensor according to claim 1, wherein the touch sensing layer in the first direction and the touch sensing layer in the second direction are formed by a same transparent conductive material having a same thickness.

3. The touch sensor according to claim 1, wherein the transparent conductive layer is formed of ITO.

4. The touch sensor according to claim 1, wherein an upper substrate is provided a surface of the touch sensor, and a groove matching with the metal bridge is disposed at a lower surface of the upper substrate.

5. A liquid crystal display having touch panel, wherein the liquid crystal display comprises the touch sensor according to claim 1 and a thin film transistor liquid crystal display panel connected with the touch sensor.

6. A method of manufacturing a touch sensor, wherein the method comprise:
   Step 1): depositing a transparent conductive layer on a substrate, and forming a touch sensing layer in a first direction and a touch sensing layer in a second direction by a first patterning process, wherein the touch sensing layer in the first direction is discontinuous, the touch sensing layer in the second direction is continuous, and the first direction and the second direction are perpendicular to each other;
   Step 2): depositing an insulation layer on the substrate after the Step 1), and forming a contact hole in the insulation layer by a second patterning process, wherein the contact hole exposes a portion of the touch sensing layer in the first direction under the contact hole; and
   Step 3): depositing a metal layer on the substrate after the Step 2), and forming a metal bridge connecting with the touch sensing layer in the first direction by a third patterning process,
   wherein the step 3) further comprises: depositing a protection layer on the substrate deposited with the metal layer, and forming the metal bridge and a transparent conductive layer by the third patterning process; and
   wherein the transparent conductive layer is provided on the metal bridge and directly contacts the metal bridge.

7. The method of manufacturing the touch sensor according to claim 6, wherein the transparent conductive layer is formed of ITO.

8. The method of manufacturing the touch sensor according to claim 6, wherein the touch sensing layer in the first direction and the touch sensing layer in the second direction have a same thickness.

9. The method of manufacturing the touch sensor according to claim 6, wherein the method further comprises:
   Step 4): providing an upper substrate on a surface of the touch sensor, wherein a groove matching with the metal bridge is disposed at a lower surface of the upper substrate.

\* \* \* \* \*